Oct. 22, 1963 W. F. MELLEN 3,107,736
MEANS OPERATED IN RESPONSE TO MOVEMENT OF AN IMPLEMENT
TO A RAISED POSITION FOR LOCKING THE IMPLEMENT
AGAINST LATERAL SWAY
Filed March 5, 1962 2 Sheets-Sheet 1
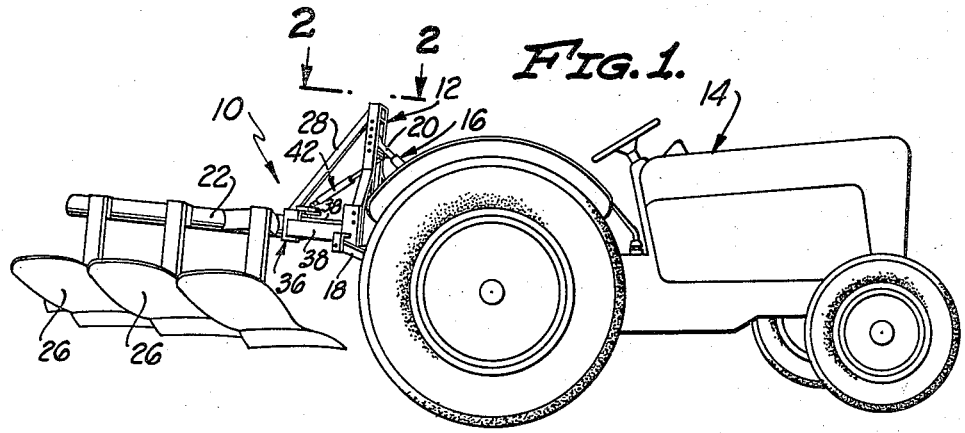
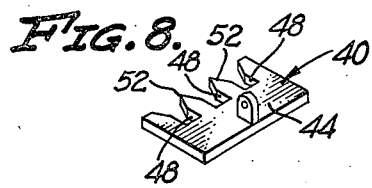
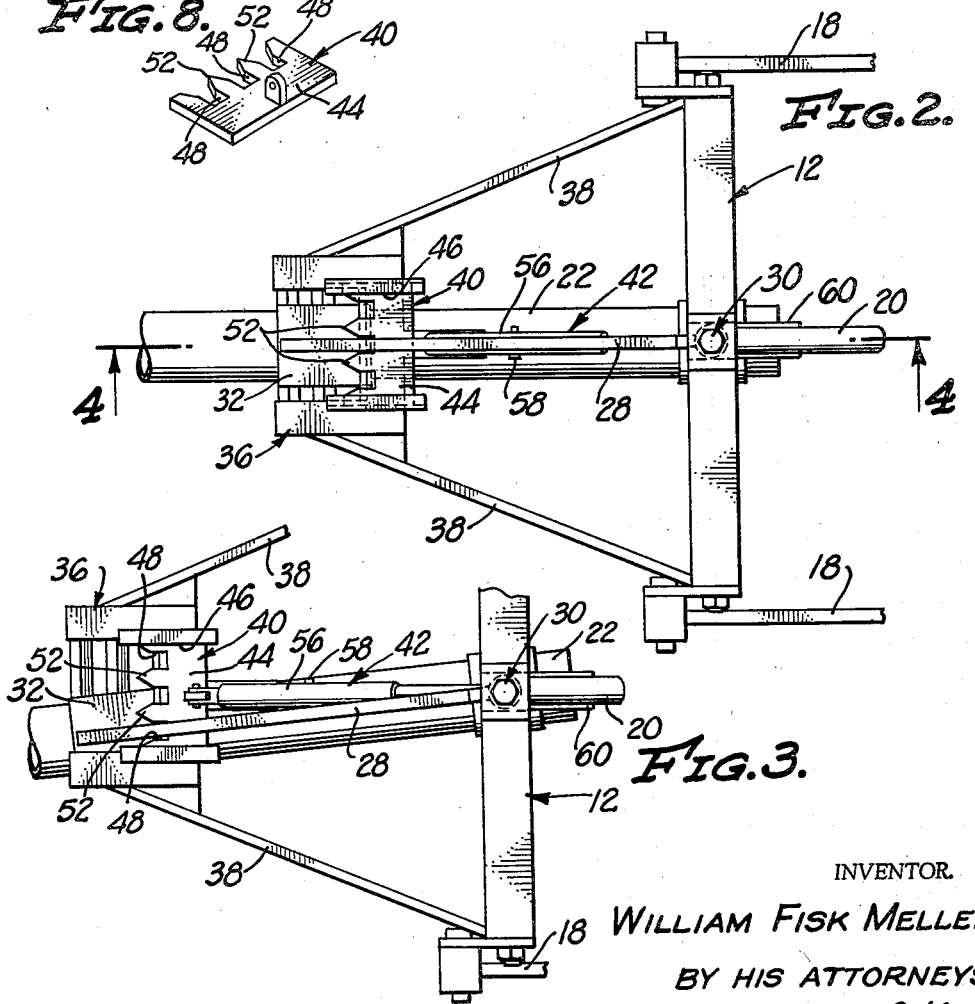
INVENTOR.
WILLIAM FISK MELLEN
BY HIS ATTORNEYS
HARRIS, KIECH, RUSSELL & KERN

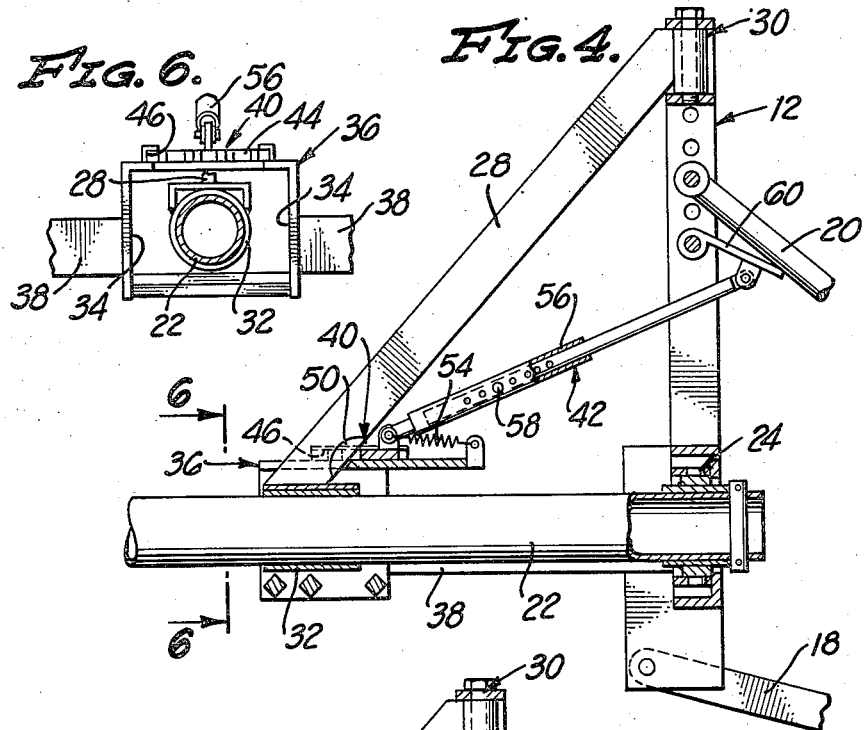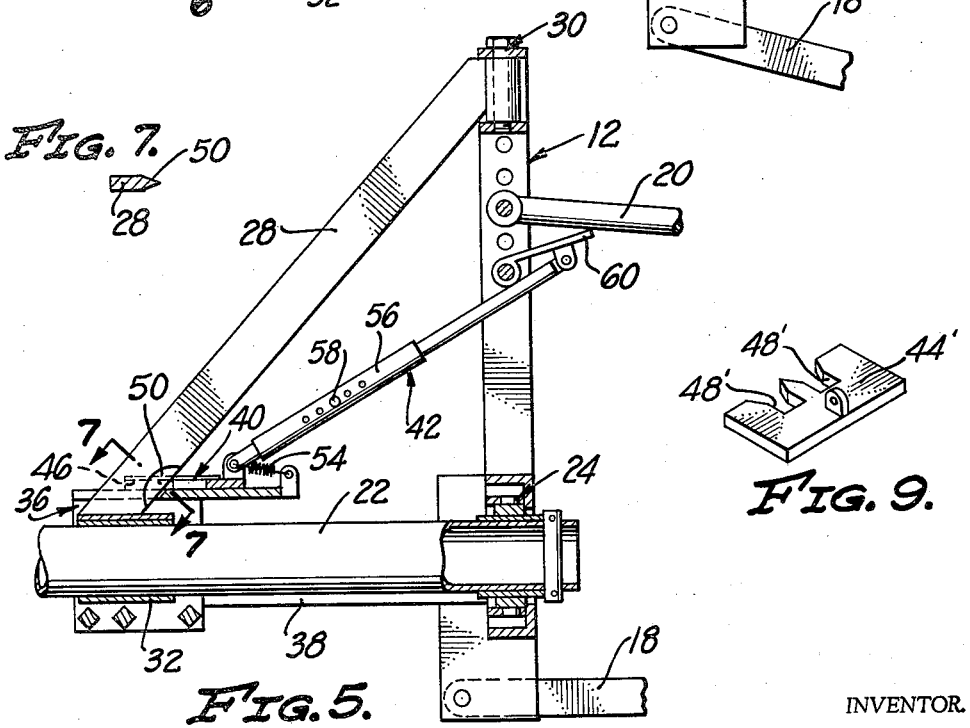

United States Patent Office 3,107,736
Patented Oct. 22, 1963

3,107,736
MEANS OPERATED IN RESPONSE TO MOVEMENT OF AN IMPLEMENT TO A RAISED POSITION FOR LOCKING THE IMPLEMENT AGAINST LATERAL SWAY
William Fisk Mellen, Anaheim, Calif.
(P.O. Box 2032, Fullerton, Calif.)
Filed Mar. 5, 1962, Ser. No. 177,545
11 Claims. (Cl. 172—457)

The present invention relates to an apparatus comprising a pivoted structure which is laterally swingable about an upright axis, and a primary object of the invention is to provide means responsive to movement of the pivoted structure into an inoperative position for automatically locking same against such lateral swinging movement.

The invention is particularly applicable to agricultural implements, such as plows, having a pivoted structure carried by and pivoted to a frame adapted to be elevated by a lifting means on a tractor, or the like, to lift the pivoted structure clear of the ground for transport, the pivoted structure being automatically locking against lateral swinging movement by the present invention under such conditions. Consequently, the pivoted structure is prevented from banging back and forth laterally during transport, which is an important feature.

For convenience, the invention will be considered herein in connection with a one-way plow which is swingable about an upright pivot axis in operation for purposes of self alignment, as disclosed in my Patent No. 2,900,032, issued August 18, 1959. When such a plow is being transported clear of the ground, the pivoted structure thereof tends to bang back and forth laterally against the stops limiting its lateral swinging movement, which is undesirable. The present invention eliminates this problem by automatically locking the pivoted structure against lateral swinging movement in response to lifting of the frame of the plow by the lifting means on the tractor, or the like. It will be understood that while the invention will be considered herein in connection with a laterally swingable one-way plow, it may be incorporated equally well in a two-way plow, or in any other apparatus having a pivoted structure that can advantageously be locked against lateral swinging movement in response to displacement into an inoperative position.

More particularly, an important object of the invention is to provide locking means on the frame of the apparatus and engageable with the pivoted structure thereof for locking the pivoted structure against lateral swinging movement relative to the frame, together with actuating means on the frame for engaging the locking means with the pivoted structure in response to lifting of the frame by the lifting means.

Still another object is to provide an actuating means for the locking means which is engageable by the lifting means in response to lifting of the frame thereby.

Still another object is to provide locking means capable of locking the pivoted structure against lateral swinging movement in different lateral positions of the pivoted structure. With this construction, it is not necessary for the pivoted structure to be in any particular position relative to the frame, being capable of being locked against lateral swinging movement in any one of a number of different angularly spaced positions.

Another object is to provide a locking means having therein two or more laterally spaced, divergent notches each adapted to receive therein an element of the pivoted structure, whereby the pivoted structure may be locked against lateral swinging movement in each of two or more angularly spaced positions.

Still another object is to provide an actuating means for the locking means which comprises a push rod connected at one end to the locking means and engageable at its other end by the lifting means for the frame of the apparatus.

The foregoing objects, advantages, features and results of the present invention, together with various other objects, advantages, features and results thereof which will be evident to those skilled in the art to which the invention relates in the light of this disclosure, may be achieved with the exemplary embodiments of the invention described in detail hereinafter and illustrated in the accompanying drawings, wherein:

FIG. 1 is a perspective view of an apparatus, specifically a plow, which embodies the invention and which is shown as mounted on a wheel-type tractor;

FIG. 2 is a fragmentary plan view on an enlarged scale taken as indicated by the arrowed line 2—2 of FIG. 1;

FIG. 3 is a view similar to FIG. 2 but showing various parts in different operating positions;

FIG. 4 is a sectional view taken along the arrowed line 4—4 of FIG. 2;

FIG. 5 is a view similar to FIG. 4, but showing various parts in different operating positions;

FIG. 6 is a fragmentary sectional view taken as indicated by the arrowed line 6—6 of FIG. 4;

FIG. 7 is a fragmentary sectional view taken as indicated by the arrowed line 7—7 of FIG. 5;

FIG. 8 is a perspective view of a locking means of the invention; and

FIG. 9 is a perspective view of an alternative locking means.

Referring initially to FIG. 1 of the drawings, the numeral 10 generally designates a plow which includes at its forward end a frame, typically an A-frame, 12 connected to a wheel-type tractor 14 by a conventional three-point hitch 16 constituting a means for lifting the plow out of the ground and for lowering it into the ground. The hitch 16 includes two lower links 18 pivotally connected to the tractor at their forward ends and pivotally connected at their rearward ends to the A-frame 12 adjacent the bottom thereof and on opposite sides, respectively, thereof. The hitch 16 also includes an upper link 20 pivotally connected at its rearward end to the A-frame 12 adjacent the top thereof, and connected to the tractor at its forward end. Associated with the three-point hitch 16 is means, usually hydraulic means, for raising and lowering the plow 10. As will be apparent from comparing FIGS. 4 and 5 of the drawings, when the plow 10 is raised from its operative position, shown in FIG. 5, to its inoperative or transport position, shown in FIG. 4, the upper link 20 pivots downwardly relative to the A-frame 12.

The plow 10, which is shown as a one-way plow for convenience, includes a fore-and-aft plow beam 22 which is pivotally connected at its forward end to the A-frame 12 for lateral swinging movement about an upright axis provided by an upright pivot means 24. The plow beam 22 carries a gang of moldboard-type plow bottoms 26 in the particular construction illustrated.

When the A-frame 12 is lifted by the hitch 16 to elevate the plow 10 into an inoperative, transport position, part of the weight of the plow beam 22 and the plow bottoms 26 thereon is transmitted to the A-frame through a downwardly and rearwardly sloping, diagonal brace 28 pivotally connected to the A-frame at its upper, forward end by an upright pivot means 30 coaxial with the pivot means 24. The lower, rearward end of the brace 28 has attached thereto a collar 32 which is slidable longitudinally of the plow beam 22 to permit lateral swinging movement of the plow beam.

With the foregoing construction, the plow beam 22 and the plow bottoms 26 carried thereby are laterally swingable about the upright axis of the pivot means 24 and 30 to provide the desired self aligning effect discussed in my aforementioned prior patent. The amplitude of such lateral swinging movement is limited by laterally spaced end walls 34 of a box-like housing 36, FIG. 6, through which the plow beam 22 extends and which is carried by braces 38 connected to the A-frame 12.

It has been found that if the plow beam 22 is permitted to swing laterally freely when it is in its elevated, transport position, the weight of the laterally swinging plow beam and plow bottoms 26 tends to cause the tractor 14 to wander. Also, the plow beam 22 bangs back and forth laterally between the end walls 34 of the box-like housing 36, which is undesirable. It will be understood that the plow beam 22 tends to swing back and forth laterally, when in its elevated position, due to terrain irregularities, turning of the tractor 14, and the like.

To eliminate the foregoing undesirable effects, the invention provides means, comprising a locking means 40 and an actuating means 42 therefor, for automatically locking the plow beam 22 against lateral swinging movement relative to the A-frame 12 in response to lifting of the plow 10 into its transport position by the hitch 16.

The locking means 40 includes a locking member 44 which is slidable forwardly and rearwardly in a guide or track 46 on the box-like housing 36. The locking member 44 is provided with a plurality, shown as three, rearwardly facing, rearwardly divergent notches 48 each of which is adapted to receive therein a portion 50 of the brace 28 when the locking member is moved rearwardly in the guide 46, the portion 50 of the brace being complementarily forwardly convergent. With this construction, upon rearward movement of the locking member 44, the portion 50 of the brace is received in whichever one of the notches 48 happens to be in approximate alignment therewith, it being noted that the notches are separated by rearwardly convergent, pointed fingers 52 that guide the portion 50 of the brace into the notch which is closest to being in alignment therewith. Thus, it is unnecessary to place the plow beam 22 in any particular lateral position for engagement of the locking member 44 with the portion 50 of the brace 28. In other words, the plow beam 22 will be locked in a lateral position corresponding to the position of the notch 48 which is closest to being in alignment with the portion 50 of the brace 28. With this construction, automatic actuation of the locking means 40 in response to lifting of the plow 10 by the hitch 16 is possible, as will now be described.

The locking member 44, which is biased forwardly toward a retracted position by a tension spring 54 interconnecting it and the box-like housing 36, has pivotally connected thereto the rearward end of a push rod or strut 56. This strut is adjustable as to length to cause it to fully actuate the locking means 40 by the time the plow 10 has been fully elevated into its transport position. More particularly, the strut 56 is made of two telescopically connected sections provided with a plurality of potentially registering holes any two of which may receive a pin 58.

At its forward end, the strut 56 is pivotally connected to a trigger-like actuator 60 which, in turn is pivotally connected to the A-frame 12. The actuator 60 is engageable by the upper link 20 of the hitch 16, in response to lifting of the plow 10 from the operating position of FIG. 5 to the inoperative, transport position of FIG. 4, to displace the strut 56 rearwardly. Such rearward displacement of the strut 56 results in rearward displacement of the locking member 44 to cause the portion 50 of the brace 28 to be received in whichever one of the notches 48 is the closest to being in alignment therewith. Thus, the plow beam 22 is automatically locked against lateral swinging movement by the hitch 16 in response to lifting of the plow 10 into its inoperative position by such hitch, which is an important feature. When the plow 10 is subsequently lowered into its operating position, the upper link 20 of the hitch 16 automatically permits the spring 54 to return the locking member 44 to its retracted or inoperative position. Thus, the plow beam 22 is automatically unlocked in response to lowering of the plow 10 into its operative position, which is another important feature.

Thus, it will be seen that the locking of the plow beam 22 as it is lifted and the unlocking thereof as it is lowered take place entirely automatically, no attention on the part of the operator being required.

In FIG. 9 of the drawings is shown an alternative locking member 44' which is identical to the locking member 44, except that it is provided with only two notches 48', instead of the three notches 48 of the locking member 44. It will be understood that other numbers of notches may be provided also.

Although exemplary embodiments of the invention have been disclosed herein for purposes of illustration, it will be understood that various modifications, changes and substitutions may be incorporated in such embodiments without departing from the spirit of the invention as defined by the claims which follow.

I claim:

1. In an apparatus to be raised and lowered by a lifting means on a tractor, or the like, the combination of:
    (a) a frame connectible to the lifting means;
    (b) a pivoted structure pivotally connected to said frame for lateral swinging movement relative thereto about an upright axis;
    (c) locking means for locking said pivoted structure against lateral swinging movement relative to said frame; and
    (d) means engageable and operable by the lifting means for actuating said locking means, to lock said pivoted structure against lateral swinging movement relative to said frame, in response to lifting of said frame by the lifting means.

2. In an apparatus to be raised and lowered by a lifting means on a tractor, or the like, the combination of:
    (a) a frame connectible to the lifting means;
    (b) a pivoted structure pivotally connected to said frame for lateral swinging movement relative thereto about an upright axis;
    (c) locking means on said frame and engageable with said pivoted structure for locking said pivoted structure against lateral swinging movement relative to said frame; and
    (d) actuating means on said frame and engageable by the lifting means for engaging said locking means with said pivoted structure in response to lifting of said frame by the lifting means.

3. In an apparatus to be raised and lowered by a lifting means on a tractor, or the like, the combination of:
    (a) a frame connectible to the lifting means;
    (b) a pivoted structure pivotally connected to said frame for lateral swinging movement relative thereto about an upright axis;
    (c) locking means on said frame and engageable with said pivoted structure for locking said pivoted structure against lateral swinging movement relative to said frame;
    (d) said locking means including means for locking said pivoted structure against lateral swinging movement relative to said frame in different lateral positions angularly spaced apart relative to said axis; and
    (e) actuating means on said frame and engageable by the lifting means for engaging said locking means with said pivoted structure in response to lifting of said frame by the lifting means.

4. In an apparatus to be raised and lowered by a lifting means on a tractor, or the like, the combination of:
    (a) a frame connectible to the lifting means;
    (b) a pivoted structure pivotally connected to said frame for lateral swinging movement relative thereto about an upright axis;
    (c) said pivoted structure including a beam extending rearwardly from said frame and pivotally connected at its forward end to said frame for lateral swinging movement relative thereto about said axis;
(d) said pivoted structure including a downwardly and rearwardly extending brace which is pivotally connected at its upper, forward end to said frame for lateral swinging movement relative thereto about said axis, and which is slidably connected to said beam at its lower, rearward end for fore-and-aft sliding movement relative to said beam;
(e) locking means on said frame and engageable with said brace for locking said pivoted structure against lateral swinging movement relative to said frame; and
(f) actuating means on said frame and engageable by the lifting means for engaging said locking means with said brace in response to lifting of said frame by the lifting means.

5. In an apparatus to be raised and lowered by a lifting means on a tractor, or the like, the combination of:
   (a) a frame connectible to the lifting means;
   (b) a pivoted structure pivotally connected to said frame for lateral swinging movement relative thereto about an upright axis;
   (c) said pivoted structure including a beam extending rearwardly from said frame and pivotally connected at its forward end to said frame for lateral swinging movement relative thereto about said axis;
   (d) said pivoted structure including a downwardly and rearwardly extending brace which is pivotally connected at its upper, forward end to said frame for lateral swinging movement relative thereto about said axis, and which is slidably connected to said beam at its lower, rearward end for fore-and-aft sliding movement relative to said beam;
   (e) locking means on said frame and movable rearwardly relative thereto into locking engagement with said brace for locking said pivoted structure against lateral swinging movement relative to said frame; and
   (f) actuating means on said frame and engageable by the lifting means for moving said locking means rearwardly into locking engagement with said brace in response to lifting of said frame by the lifting means.

6. In an apparatus to be raised and lowered by a lifting means on a tractor, or the like, the combination of:
   (a) a frame connectible to the lifting means;
   (b) a pivoted structure pivotally connected to said frame for lateral swinging movement relative thereto about an upright axis;
   (c) said pivoted structure including a beam extending rearwardly from said frame and pivotally connected at its forward end to said frame for lateral swinging movement relative thereto about said axis;
   (d) said pivoted structure including a downwardly and rearwardly extending brace which is pivotally connected at its upper, forward end to said frame for lateral swinging movement relative thereto about said axis, and which is slidably connected to said beam at its lower, rearward end for fore-and-aft sliding movement relative to said beam;
   (e) locking means on said frame and movable rearwardly relative thereto into locking engagement with said brace for locking said pivoted structure against lateral swinging movement relative to said frame;
   (f) actuating means on said frame and engageable by the lifting means for moving said locking means rearwardly into locking engagement with said brace in response to lifting of said frame by the lifting means; and
   (g) spring means interconnecting said frame and said locking means and biasing said locking means forwardly out of engagement with said brace.

7. In an apparatus to be raised and lowered by a lifting means on a tractor, or the like, the combination of:
   (a) a frame connectible to the lifting means;
   (b) a pivoted structure pivotally connected to said frame for lateral swinging movement relative thereto about an upright axis;
   (c) said pivoted structure including a beam extending rearwardly from said frame and pivotally connected at its forward end to said frame for lateral swinging movement relative thereto about said axis;
   (d) said pivoted structure including a downwardly and rearwardly extending brace which is pivotally connected at its upper, forward end to said frame for lateral swinging movement relative thereto about said axis, and which is slidably connected to said beam at its lower, rearward end for fore-and-aft sliding movement relative to said beam;
   (e) locking means on said frame and movable rearwardly relative thereto into locking engagement with said brace for locking said pivoted structure against lateral swinging movement relative to said frame;
   (f) actuating means on said frame and engageable by the lifting means for moving said locking means rearwardly into locking engagement with said brace in response to lifting of said frame by the lifting means;
   (g) spring means interconnecting said frame and said locking means and biasing said locking means forwardly out of engagement with said brace; and
   (h) said locking means having therein at least two laterally spaced, rearwardly divergent notches each adapted to receive said brace therein upon rearward movement of said locking means into locking engagement with said brace.

8. In an apparatus to be raised and lowered by a lifting means on a tractor, or the like, the combination of:
   (a) a frame connectible to the lifting means;
   (b) a pivoted structure pivotally connected to said frame for lateral swinging movement relative thereto about an upright axis;
   (c) said pivoted structure including a beam extending rearwardly from said frame and pivotally connected at its forward end to said frame for lateral swinging movement relative thereto about said axis;
   (d) said pivoted structure including a downwardly and rearwardly extending brace which is pivotally connected at its upper, forward end to said frame for lateral swinging movement relative thereto about said axis, and which is slidably connected to said beam at its lower, rearward end for fore-and-aft sliding movement relative to said beam;
   (e) locking means on said frame and movable rearwardly relative thereto into locking engagement with said brace for locking said pivoted structure against lateral swinging movement relative to said frame;
   (f) actuating means on said frame and engageable by the lifting means for moving said locking means rearwardly into locking engagement with said brace in response to lifting of said frame by the lifting means;
   (g) spring means interconnecting said frame and said locking means and biasing said locking means forwardly out of engagement with said brace; and
   (h) said actuating means comprising a fore-and-aft extending push rod connected at one end to said locking means and engageable at its other end by the lifting means upon lifting of said frame by the lifting means.

9. In an apparatus to be raised and lowered by a lifting means on a tractor, or the like, the combination of:
   (a) a frame connectible to the lifting means;
   (b) a pivoted structure pivotally connected to said frame for lateral swinging movement relative thereto about an upright axis;
   (c) said pivoted structure including a beam extending rearwardly from said frame and pivotally connected at its forward end to said frame for lateral swinging movement relative thereto about said axis;

(d) said pivoted structure including a downwardly and rearwardly extending brace which is pivotally connected at its upper, forward end to said frame for lateral swinging movement relative thereto about said axis, and which is slidably connected to said beam at its lower, rearward end for fore-and-aft sliding movement relative to said beam;

(e) locking means on said frame and movable rearwardly relative thereto into locking engagement with said brace for locking said pivoted structure against lateral swinging movement relative to said frame;

(f) actuating means on said frame and engageable by the lifting means for moving said locking means rearwardly into locking engagement with said brace in response to lifting of said frame by the lifting means;

(g) spring means interconnecting said frame and said locking means and biasing said locking means forwardly out of engagement with said brace;

(h) said actuating means comprising a fore-and-aft-extending push rod connected at one end to said locking means and engageable at its other end by the lifting means upon lifting of said frame by the lifting means; and (i) said locking means having therein at least two laterally spaced, rearwardly divergent notches each adapted to receive said brace therein upon rearward movement of said locking means into locking engagement with said brace.

10. In an apparatus to be moved to an inoperative position by a displacement means, the combination of:

(a) a frame connectible to the displacement means and displaceable to said inoperative position thereby;

(b) a pivoted structure pivotally connected to said frame for swinging movement relative thereto; and (c) means engageable and operable by said displacement means in response to displacement of said frame to said inoperative position by said displacement means for locking said pivoted structure against swinging movement relative to said frame.

11. In a ground working apparatus to be raised and lowered between a ground working position and a position clear of the ground by a lifting means on a tractor, or the like, the combination of:

(a) a frame;

(b) means for connecting said frame to said lifting means to provide for lifting of said frame by said lifting means;

(c) a pivoted structure carried by said frame and pivotally connected to said frame for lateral swinging movement relative to said frame about an upright axis;

(d) ground working means carried by said pivoted structure and liftable from a lowered, ground working position in the ground to a raised position clear of the ground in response to lifting of said frame, and said pivoted structure carried thereby, by said lifting means; and (e) means responsive to lifting of said frame, and said pivoted structure carried thereby, by said lifting means, to lift said ground working means into said raised position clear of the ground, for automatically locking said pivoted structure against lateral swinging movement relative to said frame.

References Cited in the file of this patent
UNITED STATES PATENTS

| | | |
|---|---|---|
| 1,394,253 | Dahlgren | Oct. 18, 1921 |
| 1,865,598 | Verity | July 5, 1932 |
| 1,936,513 | Klauer | Nov. 21, 1933 |